United States Patent [19]

Leng et al.

[11] 3,996,221
[45] Dec. 7, 1976

[54] DYESTUFFS

[75] Inventors: John Lindley Leng; Brian Parton; Denis Robert Annesley Ridyard; John Robert Lawson, all of Manchester, England

[73] Assignee: Imperial Chemical Industries Limited, London, England

[22] Filed: Jan. 9, 1975

[21] Appl. No.: 539,744

[30] Foreign Application Priority Data

Jan. 31, 1974 United Kingdom ............... 4576/74

[52] U.S. Cl. .......................................... 260/246 R
[51] Int. Cl.² ............ C07D 265/00; C07D 273/00; C07D 295/00
[58] Field of Search ............... 260/246 R

[56] References Cited

UNITED STATES PATENTS

| 2,763,641 | 9/1956 | Seitz et al. | 260/153 |
| 2,954,378 | 9/1960 | Pugin et al. | 260/246 |
| 3,117,957 | 1/1964 | Boyd et al. | 260/153 |

FOREIGN PATENTS OR APPLICATIONS

| 2,302,382 | 1/1973 | Germany | |

OTHER PUBLICATIONS

Chem. Abst. 62, 674(d–e)(1965) – BASF – Brit. Patent No. 942,555.

*Primary Examiner*—Albert T. Meyers
*Assistant Examiner*—D. W. Robinson
*Attorney, Agent, or Firm*—Cushman, Darby & Cushman

[57] ABSTRACT

Dyestuffs of the formula wherein
(R)$_n$ represents n substituents R each of which may be independently halogen, lower alkyl, lower alkoxy or COOH
R$^1$ is H, optionally substituted lower alkyl, optionally substituted aryl or optionally substituted aralkyl,
n is 0–3,
(a+b) is 0–4,
X is O, S or NR$^2$, where R$^2$ is H or optionally substituted lower alkyl,
Y is an optionally substituted aliphatic or optionally substituted araliphatic linking group, and
each Z is independently a H or a cellulose-reactive group, and when (a+b) is 0 there is at least one SO$_3$H group as substituent on the groups R$^1$, X or Y.

The dyestuffs when both Z are H are valuable acid dyes, e.g. for wool, and when one or both Z are reactive groups the dyestuffs are valuable reactive dyestuff especially for cellulose fibers.

3 Claims, No Drawings

DYESTUFFS

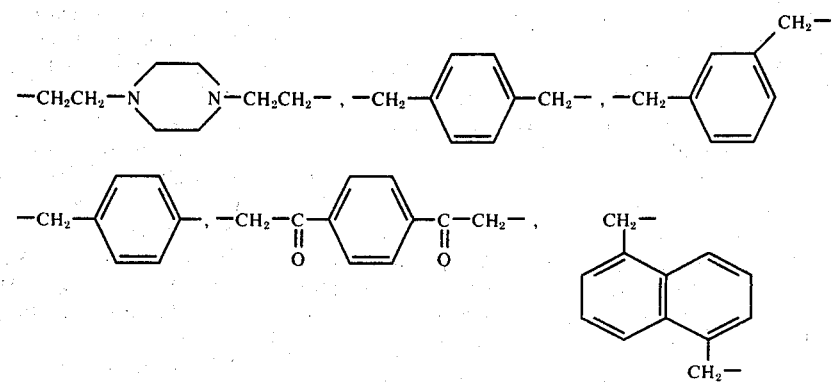

This invention relates to new dyestuffs and more particularly to new dyestuffs of the triphendioxazine series preferably having reddish-blue shades, but also red and violet shades being possible.

According to the invention, there are provided dyestuffs of the formula:

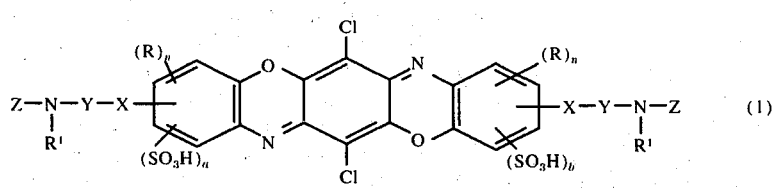

wherein:
- $(R)_n$ represents n substutuents R each of which may be independently halogen, lower alkyl, lower alkoxy or COOH;
- $R^1$ is H, optionally substituted lower alkyl, optionally substituted aryl or optionally substituted aralkyl,
- n is 0–3;
- a+b is 0–4,
- X is O, S or $NR^2$, where $R^2$ is H or optionally substituted lower alkyl,
- Y is an optionally substituted aliphatic or optionally substituted araliphatic linking group, and each Z is independently a H or a cellulose-reactive group, and when (a+b) is O there is at least one $SO_3H$ group as substituent on the groups $R^1$, X or Y.

As examples of atoms or groups represented by R, there may be mentioned Cl, Br, $CH_3$, $OCH_3$ or COOH.

As examples of the atoms or group $R^1$ there may be mentioned H, methyl, ethyl, phenyl, 3- and 4-nitrophenyl, 3- and 4-sulphophenyl, benzyl, 3- and 4-sulphobenzyl, $CH_2SO_3H$, β-hydroxyethyl, and β-sulphatoethyl.

As examples of atoms or groups represented by $R^2$ there may be mentioned H, $CH_3$, $C_2H_5$, $CH_2SO_3H$.

As examples of groups represented by Y there may be mentioned ethylene, 1,2- and 1,3-propylene, 2-hydroxy-1,3-propylene, 1- and 2-phenyl -1,3-propylene, 2-(4'-sulphophenyl)-1,3-propylene, 1,4-, 2,3-and 2,4-butylene, 2-methyl-1,3-propylene, 2-methyl-2,4-pentylene, 2,2-dimethyl-1,3-propylene, 1-phenylethylene, 1-chloro-2,3-propylene, 1,6- and 2,5-hexylene, 2,3;-diphenyl-1,4-butylene, 1-(methoxycarbonyl)-1,5-pentylene, 1-carboxy-1,5-pentylene, 2,7-heptylene, 3-methyl-1,6-hexylene $-CH_2CH_2OCH_2CH_2-$, $-CH_2CH_2SCH_2CH_2-$, $-CH_2CH_2SSCH_2CH_2-$, In those cases where X is $NR^2$ the group represented by $R^2$ may, in addition to the group Y, be linked to both nitrogen atoms in the structure $-X - Y - NR^1-$. As examples of such a grouping there may be mentioned

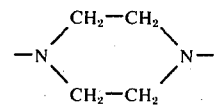

By the term cellulose reactive group is meant a group containing at least one cellulose reactive substituent by which is meant an atom or group capable of reacting with cellulose, in the presence of an alkali, to form a covalent bond.

As examples of cellulose-reactive groups represented by Z, there may be mentioned aliphatic sulphone groups which contain a sulphate ester group in β-position to the sulphur atom, e.g. the β-sulphatoethylsulphone group, α,β-snsaturated acyl radicals of aliphatic carboxylic acids for example, acrylic acid, α-chloroacrylic acid, propiolic acid, maleic acid and mono- and dichloromaleic acids; also the acyl radicals of acids which contain a cellulose-reactive substituent, e.g. the radical of a halogenated aliphatic acid such as chloroacetic acid, β-chloro and β-bromopropionic acids and α,β-dichloro- and dibromo-propionic acids. Other examples of cellulose or polyamide-reactive groups are tetrafluorocyclobutane carbonyl, trifluorocyclobutene carbonyl, tetrafluorocyclobutylethenyl carbonyl, trifluorocyclobuteneethenyl carbonyl, and heterocyclic radicals which contain 2 or 3 nitrogen atoms in the heterocyclic ring and at least one cellulose-reactive substituent on a carbon atom of the ring.

As examples of such heterocyclic radicals, there may be mentioned, for example
2:3-dichloro-quinoxaline-5- or -6-sulphonyl,
2:3-dichloro-quinoxaline-5- or -6-carbonyl,
2:4-dichloro-quinazoline-6- or -7-sulphonyl,
2:4:6-trichloro-quinazoline-7- or -8-sulphonyl,
2:4:7- or 2:4:8-trichloro-quinazoline-6-sulphonyl,
2:4-dichloro-quinazoline-6-carbonyl, 1:4-dichloro-phthalazine-6-carbonyl,
4:5-dichloro-pyridaz-6-on-1-yl,
2:4-difluoro-5-chloropyrimid-6-yl,
2:4-dichloro-pyrimidine-5-carbonyl,
2-methyl-sulphonyl-5-chloro-6-methylpyrimid-4-yl,
4(4:5-dichloro-pyridaz-6-on-1-yl)benzoyl,
4-(4:5-dichloro-pyridaz-6-on-1-yl)phenylsulphonyl,
and, more particularly s-triazin-2-yl and pyrimidin-2-yl or -4-yl radicals which contain on at least one of the remaining 2-, 4- and 6-positions, a bromine or, preferably, a chlorine atom, a sulphonic acid group, a thiocyanato group, an aryloxy or arylthio group containing an electronegative substituent such as sulphophenoxy, sulphophenylthio, nitrosulphophenoxy, disulphophenoxy and sulphonaphthoxy, or a group of the formula:

(2)

wherein $Y^1$ represents a group of atoms necessary to form a 5- or 6- membered heterocyclic ring which may carry substituents or form part of a fused ring system; or a quaternary ammonium e.g. pyridinium or 3'-carboxypyridinium group; or a group of the formula:

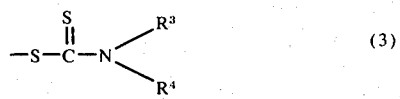

(3)

wherein $R^3$ and $R^4$ each represents the same or different alkyl, cycloalkyl, aryl or aralkyl group, or $R^3$ and $R^4$ together form, together with the nitrogen atom, a 5- or 6-membered heterocyclic ring; or a group of the formula:

(4)

wherein $R^5$ and $R^6$ may be the same or different and each represents a hydrogen atom or an alkyl, aryl or aralkyl group.

In the cases where the pyrimidine ring or triazine ring carries only one such cellulose-reactive substituent, the said ring may have a non-reactive substituent on the remaining carbon atoms.

By a non-reactive substituent there is meant a group which is bound by a covalent bond to a carbon atom of the triazine or pyrimidine nucleus, which covalent bond is not ruptured under the conditions used for application of the reactive dye.

As examples of such substituents, there may be mentioned, for example, primary amino and hydroxyl groups, also mono- or di-substituted amino groups, etherified hydroxyl and etherified mercapto groups; in the case of substituted amino groups, this class includes for example, mono- and di-alkylamino groups in which the alkyl groups preferably contain at most 4 carbon atoms, and which may also contain substituents for example, hydroxyl or alkoxy groups, and phenylamino preferably sulphonated phenylamino which may be further substituted on the nucleus, e.g. by $CH_3$, $OCH_3$, $CO_2H$ or Cl, or on the N atom e.g. by methyl, ethyl, hydroxyethyl or sulphomethyl, and naphthylamino groups preferably sulphonated naphthylamino containing up to 3 $SO_3H$ groups; in the case of etherified hydroxyl and mercapto groups, this class includes, for example, alkoxy and alkylthio groups preferably those of low molecular weight, i.e. having up to 4 carbon atoms and phenoxy, sulphonated phenoxy, phenylthio, naphthoxy or naphthylthio groups; as particular examples of all these classes there may be mentioned for example: methylamino, ethylamino, dimethylamino, β-hydroxyethylamino, di-(β-hydroxyethyl)-amino, β-chloroethylamino, cyclohexylamino, anilino, p-chloroanilino, p-nitroanilino, o-, m- and p-sulphophenylamino, 2,4-, 2,5- and 3,5-disulphophenylamino, N-methylsulphophenylamino, N-β-hydroxyethylsulphophenylamino, mono-, di- and tri-sulphonaphthylamino, 4- and 5-sulpho-o-tolylamino, 2-carboxyphenylamino and 5-sulpho-2-carboxyphenylamino, N-ω-sulphomethylphenylamino and 3-sulpho- or 4-methyl-N-ω-sulphomethylphenylamino, methoxy, ethoxy, and butoxy, phenoxy, p-sulphophenoxy and chlorophenoxy and phenylthio groups.

Chlorine atoms or cyano, nitro, carboxy and carbalkoxy groups in the 5 -position of a pyrimidyl radical come into the category of non-reactive substituents.

If desired, a non-reactive substituent may itself be the residue of a coloured amine, e.g. of the azo, anthraquinone or phthalocyanine series. Dyes of this kind have the basic reddish-blue shade provided by the triphendioxazine nucleus modified by the shade of the second chromophoric group.

Furthermore, a non-reactive substituent may contain a reactive grouping; into this category come, e.g. anilino or naphthylamino groups substituted by a β-sulphatoethylsulphonyl, β-sulphatoethylsulphonylamino or β-chloroethylsulphonyl group, or more especially, diamine radicals of the formula:

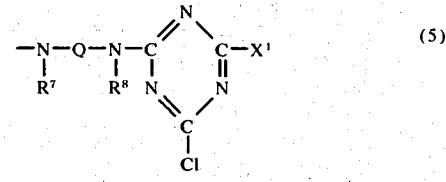

(5)

either wherein $R^7$ and $R^8$ independently represent H or alkyl or hydroxyalkyl radicals having up to 4 carbon atoms, and Q represents an aliphatic or aromatic linking group, or

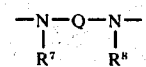

represents the N,N'-piperazinylene radical, and $X^1$ represents Cl, $OCH_3$, $NH_2$ or an anilino or sulphonated anilino radical which may be further substituted by Cl, $CH_3$, $OCH_3$ or $CO_2H$, or a sulphonated naphthylamine radical.

As examples of $R_7$ and $R_8$ in formula (5), there may be mentioned methyl, ethyl, butyl, β-hydroxyethyl.

As examples of radicals represented by Q in formula (5) there may be mentioned alkylene, poly(alkyleneimine), or dialkyloxide radicals, e.g. ethylene, propylene, tri-, tetra- and hexa-methylene, $-C_2H_4NHC_2H_4-$, $-C_2H_4(NHC_2H_4)_2-$, $-C_2H_4OC_2H_4-$ or a divalent aromatic radical of the benzene or naphthalene series which preferably contains 1 or 2 SO₃H groups, e.g. a mono- or disulpho-m-phenylene, mono- or di-sulpho-p-phenylene or a disulphonaphthylene radical, or a divalent radical of the stilbene, diphenyloxide, diphenylmethane, diphenylurea, diphenoxyethane or diphenylamine series which preferably contains 1 or 2 SO₃H groups.

The preferred dyestuffs of formula (1) are compounds of the formula

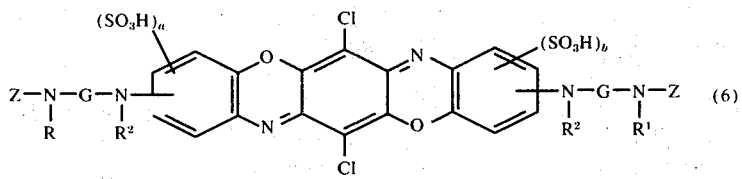

wherein $a + b$ is from 0 to 3 particularly from 0 to 2, G is an optionally substituted alkylene group having between 2 to 4 carbon atoms and Z, R¹ and R² have the meanings stated above provided that when $a + b$ is 0 there is at least one SO₃H substituent on R¹, R² or G.

It is further preferred that the groups

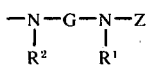

are linked to the benzene rings in the position para to the nitrogen atom of the adjacent heterocyclic ring i.e. is represented by formula (6A)

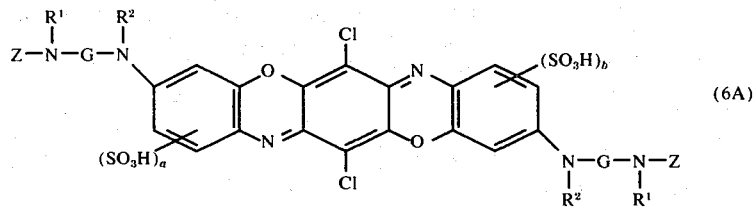

where R¹, R², Z, G, a and b have the meanings given above.

It is particularly preferred that one or both of the groups represented by Z shall be a s-triazine group bearing a chlorine atom especially when further substituted by a group of formula (5).

A further particular preference is for dyestuffs of formula (6) or (6A) in which the group G is CH₂CH₂ or CH₂CH(OH)CH₂.

The invention also provides a process for the manufacture of new dyestuffs of formula (1) when Z represents H and R, R¹, X, Y, m and n have the meanings stated above which comprises reacting 2,3,5,6-tetrachloro-1,4-benzoquinone with 2 moles of a diamine of the formula

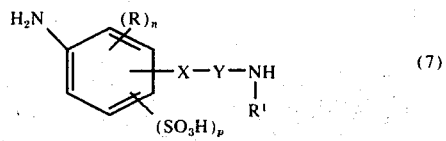

wherein R, R¹, X, Y and n have the meanings stated above and p has a value of 0 or 1 and heating the resulting dianilide in the presence of a strongly acid condensing agent, e.g. oleum, to effect ring closure. Further SO₃H groups may be introduced during the ring closure.

As examples of diamines of formula (7) there may be mentioned
4-(2'-aminoethyl)aminoaniline-3-sulphonic acid
4-(2'-aminoethyl)aminoaniline
4-(3'-amino-2'-hydroxypropyl)aminoaniline-3-sulphonic acid
4-[2'-(3''-sulphophenyl)aminoethyl]aminoanilino-3-sulphonic acid
4-(2'-aminoethoxy)aniline
4-(3'-aminopropyl)aminoaniline-3-sulphonic acid
4-(2'-(4''-sulphophenyl)-3'-aminopropyl)aminoaniline-3-sulphonic acid
4-(2'-(3''-sulphophenyl)-3'-aminopropyl)aminoaniline-3-sulphonic acid
4-(2'-phenyl-3'-aminopropyl)aminoaniline-3-sulphonic acid
4-(2'-(phenylamino)ethyl)aminoaniline-3-sulphonic acid
4-(2'-(4''-sulphophenylamino)ethyl)aminoaniline-3-sulphonic acid
4-(2'-phenyl-2'-aminoethyl)aminoaniline-3-sulphonic acid.

The invention further provides a process for the manufacture of new dyestuffs of formula (1) wherein at least one Z represents a cellulose reactive group which comprises reacting diamino compounds of formula (1) wherein Z represents H and R, R¹, X, Y, m and n have the meanings stated above with the anhydride or halide of an acid of which the acid radical contains a cellulose-reactive substituent or a heterocyclic compound which contains a halogen atom attached to a carbon atom of a heterocyclic nucleus and also a cellulose-reactive substituent.

The above process can conveniently be carried out by stirring a mixture of the reactants in an aqueous medium at a suitable temperature, which may be from 0° C in the case of cyanuric chloride to 50° C or even higher in the case of less reactive acyl halides, anhydrides or heterocyclic compounds. As a general rule it is preferred to add an acid-binding agent during the course of the reaction to maintain the pH within the limits 8 to 11.

As examples of diamino compounds there may be mentioned any of te reaction products of 2,3,5,6-tetrachloro-1,4-benzoquinone and diamines of formula (7) described above.

As examples of halides or anhydrides of acids or heterocyclic compounds which may be used, there may be mentioned, for example, carbyl sulphate and the anhydrides or acid halides of α,β-unsaturated aliphatic acids such as chloromaleic anhydride, propiolyl chloride and acryloyl chloride, the acid chlorides of halogenated aliphatic acids, e.g.
  chloroacetyl chloride,
  sulphochloroacetyl chloride,
  β-bromo- and β-chloro-propionyl chlorides,
  α,β-dichloro- and dibromo-propionyl chlorides,
  2,2,3,3-tetrafluorocyclobutane carbonyl chloride,
  α-(2,2,3,3-tetrafluorocyclobutyl)acryloyl chloride,
  2,3,3-trifluorocyclobut-1-ene carbonyl chloride,
  β-(2,3,3-trifluorocyclobut-1-enyl)acrylyl chloride,
also heterocyclic compounds which contain at least 2 nitrogen atoms in the heterocyclic rings and which contain 2 or more halogen, especially chlorine atoms in the ortho position to the nitrogen atoms, e.g.
  2:3-dichloro-quinoxaline-5- and -6-carbonyl chlorides,
  2:3-dichloroquinoxaline-5- and -6-sulphonyl chlorides,
  2:4-dichloro-quinazoline-6- and -7-sulphonyl chlorides, 2:4:6-trichloro-quinazoline-7- and -8-sulphonyl chlorides,
  2:4:7- and 2:4:8-trichloro-quinazoline-6-sulphonyl chlorides,
  2:4-dichloro-quinazoline-6-carbonyl chloride,
  1:4-dichloro-phthalazin-6-carbonyl chloride,
  2:4-dichloro-pyrimidine-5-carbonyl chloride,
  β-(4:5-dichloro-pyridazonyl-1-)propionyl chloride,
  1-(4'-chloroformylphenyl)-4:5-dichloro-6-pyridazone,
  1-(4'-chlorosulphonylphenyl)-4:5-dichloro-6-pyridazone,
  2:4:6-tribromo- and trichloro-pyrimidines,
  2:4:6-trifluoro-5-chloropyrimidine,
  2:4:5:6-tetrachloropyrimidine,
  2-methylsulphonyl-4,5-dichloro-6-methyl pyrimidine,
  5-methyl-2:4:6-trichloropyrimidine,
  5-nitro-2:4:6-trichloropyrimidine,
  2:4-dichloro-5-nitro-6-methyl-pyrimidine,
  2:4-dichloro-5-nitropyrimidine,
  2:4:6-trichloro-5-cyanopyrimidine,
  5-ethoxycarbonyl-2:4-dichloropyrimidine,
  2:4-dichloropyrimidine-5-carbonyl chloride,
  cyanuric bromide,
  cyanuric chloride,
also the primary condensation products of cyanuric bromide or cyanuric chloride with ammonia, an alkali metal sulphite or thiocyanate or an organic mercaptan, hydroxy compound or an organic primary or secondary amine, for example:
  methanol,
  ethanol,
  iso-propanol,
  phenol,
  o-, m- and p-chlorophenols,
  o-, m- and p-cresols,
  o-, m- and p-sulphophenols,
  thiophenol,
  thioglycollic acid,
  di-methyldithiocarbamic acid,
  mercaptobenzthiazole,
  thioacetamide,
  methylamine,
  dimethylamine,
  ethylamine,
  diethylamine,
  n-propylamine,
  iso-propylamine,
  butylamine,
  hexyl- and cyclohexyl-amines,
  toluidine,
  piperidine,
  morpholine,
  methoxyethylamine,
  ethanolamine,
  aminoacetic acid,
  aniline-2:4-, 2:5- and 3:5-disulphonic acids,
  orthanilic, metanilic and sulphanilic acids,
  2-, 3- and 4-aminobenzoic acids,
  4- and 5-sulpho-2-aminobenzoic acids,
  4- and 5-sulpho-o-toluidines,
  5-amino-2-hydroxybenzoic acid,
  2-amino-ethanesulphonic acid,
  amino-naphthalene mono- and di-sulphonic acids,
  N-methylaminoethane sulphonic acid,
  m-aminophenyl-β-sulphatoethyl sulphone,
  2-methoxy-5-β-sulphatoethyl sulphonyl aniline,
  m-β-chloroethylaminosulphonyl aniline,
also the primary condensation products of cyanuric chloride with coloured amines, e.g. of the aminoazo, aminoanthraquinone or aminophthalocyanine series; also, the secondary condensation products of cyanuric chloride with:
  alkali metal sulphites,
  alkali metal thiocyanates,
  phenols and thiophenols,
containing an electronegative substituent, and compounds of the formulae:

 (8)

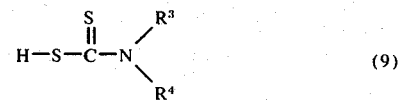 (9)

and

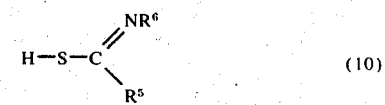 (10)

wherein $Y^1$, $R^3$, $R^4$, $R^5$ and $R^6$ have the meanings stated above.

Reactive groups of formula (5) above can be introduced by using a bis-triazinyl diamine of the formula:

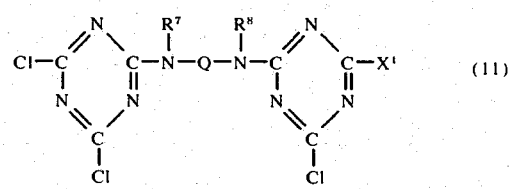 (11)

wherein $R^7$, $R^8$, Q and $X^1$ have the meanings stated in connection with formula (5) i.e. the condensation product of 2 moles of cyanuric chloride, or of 1 mole of cyanuric chloride and 1 mole of a triazine of the formula:

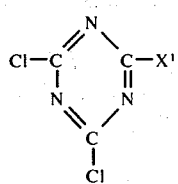

with one mole of a diamine of formula

As examples of diamines of formula (13), there may be mentioned:
piperazine,
aliphatic diamines, e.g. alkylene diamines and other α,ω-diamino
aliphatic compounds, e.g.
ethylene diamine,
1,2- and 1,3-propylene diamines,
1,6-hexylene diamine,
diethylene triamine,
triethylene tetramine,
di-(β-aminoethyl) ether,
aromatic diamines of the benzene and naphthalene series, more especially those containing 1 or 2 $SO_3H$ groups, e.g.:
m- and p-phenylenediamine,
1,3-phenylenediamine-4-sulphonic and 4,6-sisulphonic acids,
1,4-phenylenediamine-2-sulphonic and 2,5-disulphonic acids,
2,6-naphthylene diamine-4-sulphonic and 4,8-disulphonic acids,
1,5-naphthylene diamine-2- and 4-sulphonic and 3,7-disulphonic acids,
4,4'-diaminodiphenyl-2-sulphonic and 2,2'-disulphonic acids,
4,4'-diaminostilbene-2,2'-disulphonic acid,
4,4'-diaminodiphenylurea-2,2'- and 3,3'-disulphonic acids,
4,4'-diaminodiphenylamine-2,2'-disulphonic acid,
4,4'-diaminodiphenoyxethane-2,2'-disulphonic acid,
4,4'-diaminodiphenylmethane-2,2'-disulphonic acid,
4,4'-diaminoazobenzene-2-sulphonic and 2,2'-disulphonic acids,
N-methyl and N-ethyl-1,4-phenylenediamine-2-sulphonic acids
N-(β-hydroxyethyl)ethylene diamine,
1,6-naphthylene diamine-3,8-disulphonic acid.

The dyes of formula (1) wherein the cellulose-reactive group Z is or contains a s-triazine nucleus substituted by a chlorine or bromine atom and an amino or substituted amino group can also be obtained by reacting a cellulose-reactive dye of formula (1) in which Z is or contains a dichloro- or dibromo-s-triazine group with ammonia or an amine.

The cellulose-reactive dyes of formula (1) wherein the cellulose-reactive group is or contains a s-triazine nucleus substituted by $SO_3H$, a quaternary ammonium group or a group of formulae (2), (3) and (4), can be obtained by reacting a cellulose-reactive dye of formula (1) containing a s-triazine group substituted by at least one chlorine or bromine atom with an alkali metal salt of sulphurous acid, a tertiary amine or a compound of formulae (8), (9) and (10).

These reactions also may be carried out by stirring the reactants together in an aqueous medium at a suitable temperature which, in general, will be within the range of 30°–95° C, and maintaining the pH at an appropriate value by addition of an acid-binding agent. In the case where ammonia or amine is the reactant, an excess can often be used to act as acid-binding agent. Otherwise, sodium carbonate or sodium hydroxide may conveniently be used as acid-binding agent.

Dyestuffs in which one or both of the groups Z are chloro-s-triazinyl groups having a substituent of formula (5) may also be prepared by reacting a diamine of formula (13) in either order with a triazine of formula (12) and a dyestuff of formula (1) wherein at least one Z represents a dichloro-s-triazine radical.

The invention further provides a process for the manufacture of compounds of formula (1) in which $R^1$ and/or $R^2$, if present, represents $CH_2SO_3H$, Z represents H and R, X, Y, m and n have the meanings stated above by reacting the corresponding compounds in which $R^1$ and/or $R^2$, if present, represents H with formaldehyde and an alkali metal bisulphite at a temperature of 20°–100° C and a pH of 5–10.

The new dyestuffs can be isolated from the medium in which they have been prepared by conventional methods used for isolation of water-soluble dyestuffs, e.g. by salting out followed by filtration and drying out by spray-drying the reaction mixture. If desired, stabilisers e.g. alkali hydrogen phosphates, or diluents e.g. sodium chloride or urea, may be added.

When both Z in formula (1) represents H the new dyestuff may be used as acid dyes for wool or nylon and may be applied by any conventional processes. Such materials may also be used as direct dyes for cellulose and applied by any conventional process and in conjunction with any conventional dyeing auxilliary such as sodium chloride or sodium sulphate.

These materials may also be used as intermediates for the preparation of cellulose reactive dyestuffs, for example, by processes such as those described above.

When one or both Z in formula (1) is a cellulose reactive group the new dyestuffs may be used as reactive dyestuffs for cellulose textile materials which they colour in bright reddish blue or red shades of excellent fastness to washing and light when applied in conjunction with acid-binding agents. They are particularly suitable for exhaust dyeing. Because of their high tinctorial strength, the amount of dyestuff used to achieve quite deep shades is small, resulting in relatively economic dyeings and they show good build up. The new dyes are also associated with high levels of fixation.

The reactive dyes may also be used for colouring natural and synthetic nitrogenous fibres, for example wool, silk and nylon. When applied to such fibres brilliant blue shades are produced having good fastness to wet treatments and to light.

The invention is illustrated by the following Examples in which parts and percentages are by weight:

EXAMPLE 1

A. A suspension of 6.1 parts of 2,3,5,6-tetrachlorobenzo-1,4-quinone in 15 parts of water and 5 parts of acetone is added to a solution of 16 parts of 4-(2'-aminoethylaminp)aniline-3-sulphonic acid in 200 parts of water at 30°. 60 parts of a 10% aqueous solution of sodium acetate are added, bringing the pH to 5.5, and the resulting mixture stirred and heated at 45°–50 ° for 2 hours at pH 5.3–5.5. The mixture is cooled to 10°, and the precipitated brown solid collected, washed successively with 300 parts of cold water and 300 parts of acetone and dried at 60° for 2 hours.

7.5 parts of the foregoing product are added to 150 parts of 25% oleum, and the mixture stirred at 50° for 10 minutes, cooled to 20°, stirred at 20° for 30 min and added to 500 parts of ice and water. The precipitate is filtered off and washed with 200 parts of cold water. The crude produce is dissolved in 400 parts of water containing 7 parts of 40% aqueous sodium hydroxide, the resulting pH of the solution being 11.0. 30 parts of a saturated aqueous solution of potassiuma acetate are added, and the purified product filtered off, washed with 10% aqueous potassium acetate and finally with 800 parts of ethanol and dried at 60°.

The resulting product is believed to be represented by formula (1) wherein Z and $R^1 = H$, $n = 0$, $a = b = 1$, $Y = CH_2CH_2$ and $X = NH$.

The 4-(2'-aminoethylamino)aniline-3-sulphonic acid used can be obtained by condensing 4-nitrochlorobenzene-2-sulphonic acid with an excess of ethylene diamine and reducing the resulting nitroamine compound, or alternatively monoacetylethylene diamine can be condensed with 4-nitrochlorobenzene-2-sulphonic acid, and the resulting 4-(2'-acetylaminoethylamino)-nitrobenzene-3-sulphonic acid hydrolysed with aqueous sodium hydroxide to 4-(2'-aminoethylamino)-nitrobenzene-3-sulphonic acid which can in turn be reduced, giving 4-(2'-aminoethylamino)-aniline-3-sulphonic acid.

B. A solution of 4 parts of cyanuric chloride in 50 parts of acetone is added to 50 parts of ice-water. A solution of 6 parts of the product described above in 600 parts of water adjusted to pH 9.0 with N sodium hydroxide is then added to the cyanuric chloride suspension. The resulting mixtue is stirred at 0°–5° for 2 hours, maintaining the pH in the range 8.5–9.0 with the addition of N sodium hydroxide. The mixture is filtered to remove excess cyanuric chloride and the filtrate adjusted to pH 7, and amounted to 800 parts of a blue solution.

To 250 parts of the above blue solution is added a mixture of 1.7 parts of potassium dihydrogen phosphate and 0.8 parts of disodium hydrogen phosphate and the resulting solution poured into 1000 parts of acetone at 0°–5°. The precipitated dyestuff is filtered off, washed with acetone and vacuum dried at 20°–25° C.

The product obtained dyes celluose textile materials in bright reddish-blue shades of good fastness to light.

EXAMPLE 2

A neutral aqueous solution of 10 parts of metanilic acid is added to 550 parts of the blue dystuff solution obtained as described in Example 1 and the resulting mixure stirred at 45°–50°: for 5 hours, maintaining the pH at 7 ± 0.2. The mixture is then poured into 2000 parts of ethanol, and the precipitated dyestuff collected, washed with acetone and vacuum dried at 20°–25° C.

The product obtained dyes cellulose textile materials in bright reddish-blue shades of good fastness to light.

EXAMPLE 3

In place of the 4 parts of cyanuric chloride in Example 1 are used 4 parts of 1-methoxy-3,5-dichloro-s-triazine. At the end of the condensation the pH of the reaction mixture is adjusted to 7 with hydrochloric acid and salt 5% (w/v) is added. The precipitated dyestuff is collected and dried.

When applied to wool or nylon from a neutral to weakly acid dyebath, the dyestuff yields a brilliant blue shade having good fastness to wet treatments and to light.

EXAMPLE 4

A suspension of 61.5 parts of 2,3,5,6-tetrachlorobenzo-1,4-quinone in 100 parts of water containing 1 part of Calsolene Oil is added to a solution of 205 parts of 4-(2'-aminoethylamino)aniline-3-sulphonic acid in 1200 parts of water at 40°, and the resulting mixture heated to 50°–55°. 136 parts of sodium acetate trihydrate are then added portionwise with stirring over 2 hours at 50°–55° such that the pH is maintained in the range 5.5–5.5. The mixture is stirred a further 3 hours at 50°–55° at pH 5.3–5.5, cooled to 10° and the precipitated product filtered off, washed with 300 parts of cold water and 300 parts of acetone and dried at 60° for 18 hours.

40 parts of the foregoing product are added to 800 parts of 25% oleum, and the mixture raised to 60° over 12 minutes. The mixture is cooled to 20°–25° with stirring over 45 minutes, poured into 1200 parts of ice and water, maintaining the temperature below 15°, stirred for 5 minutes at 5°–10° and the crude product filtered off and washed with 500 parts of cold water.

The crude product paste is dissolved in 2000 parts of water containing 40 parts of potassium hydroxide at 30° and reprecipitated with the addition of approximately 500 parts of saturated aqueous potassium acetate solution. After stirring for 30 minutes, the purified product is collected washed with approximately 100o parts of ethanol and dried at 60°.

A solution of 3.5 parts of metanilic acid in 50 parts of water containing approximately 10 parts of 2N aqueous sodium hydroxide is added dropwise to a stirring suspension of 4 parts of cyanuric chloride in 40 parts of acetone and 40 parts of water at 0°–5°, maintaining the pH in the range 6.0–7.0 with the addition of 10.8 parts of 2N aqueous sodium hydroxide. After stirring for 1 hour, the mixture is filtered and the filtrate, [a solution of 2,4-dichloro-6-(m-sulphoanilino)-s-triazine] added to a solution of 3.5 parts of the intermediate described above in 200 parts of water and the mixture stirred and heated at 45°–50° for 8 hours, maintaining the pH in the range 9 to 9.2. The mixture is cooled to 20°–25°, salted to 25% w/v with sodium chloride and the precipitated dyestuff filtered off, washed with saturated brine and dried at 60°.

The product obtained is similar in constitution to that described in Example 2, and dyes cellulose textile materials in bright reddish-blue shades of good fastness to light.

Following the procedure of Example 4 similar dyestuffs are made using the following amines in place of the metanilic acid.

| Example | Amine |
|---|---|
| 5 | 2-carboxyaniline-4,5-disulphonic acid |
| 6 | aniline-2,5-disulphonic acid |
| 7 | aniline-3,5-disulphonic acid |
| 8 | N-sulphomethylaniline |
| 9 | aniline-2,4-disulphonic acid |
| 10 | 2-carboxyaniline-4-sulphonic acid |
| 11 | 3-aminoaniline-4-sulphonic acid |
| 12 | 4-aminoaniline-3-sulphonic acid |

-continued

| Example | Amine |
|---------|-------|
| 13 | 3-aminoaniline-4,6-disulphonic acid |
| 14 | 4-aminoaniline-2,5-disulphonic acid |
| 15 | sulphanilic acid |
| 16 | orthanilic acid |
| 17 | 1-aminonaphthalene-6-sulphonic acid |
| 18 | 1-aminonaphthalene-7-sulphonic acid |
| 19 | 2-aminonaphthalene-5,7-disulphonic acid |
| 20 | 2-aminonaphthalene-6,8-disulphonic acid |
| 21 | 2-aminonaphthalene-8-sulphonic acid |
| 22 | 2-aminonaphthalene-7-sulphonic acid |
| 23 | 1-aminonaphthalene-3,8-disulphonic acid |
| 24 | 1-aminonaphthalene-3,6,8-trisulphonic acid |
| 25 | 2-methylaniline-5-sulphonic acid |
| 26 | 4-chloroaniline-3-sulphonic acid |

Following the procedure in Example 4 similar dyestuffs are obtained if the 2,4-dichloro-6-arylamino-s-triazines used in Examples 4–26 are replaced by equivalent amounts of the following acylating agents.

| Example | Acylating Agent |
|---------|-----------------|
| 27 | 2,4-dichloro-6-β-hydroxyethylamino-s-triazine |
| 28 | 2,4-dichloro-6-di-β-hydroxyethylamino-s-triazine |
| 29 | 2,4-dichloro-6-β-hydroxypropylamino-s-triazine |
| 30 | 2,4-dichloro-6-methoxy-s-triazine |
| 31 | 2,4-dichloro-6-amino-s-triazine |
| 32 | 2,4-dichloro-6-methylamino-s-triazine |
| 33 | 2,3-dichloroquinoxaline-6-sulphonyl chloride |
| 34 | 2,4,5,6-tetrachloropyrimidine |
| 35 | 2,4-dichloro-6-n-butyoxy-s-triazine |
| 36 | 2,4-dichloro-6-dimethylamino-s-triazine |
| 37 | 2,4,6-trichloropyrimidine |
| 38 | 1,4-dichlorophthalazine-6-carbonyl chloride |
| 39 | 2,4,6-trichloro-5-cyanopyrimidine |
| 40 | 2,4-dichloro-6-p-sulphophenoxy-s-triazine |
| 41 | 2,4,6-trifluoro-5-chloropyrimidine |
| 42 | 1-(4'-chlorocarbonylphenyl)-4,5-dichloro-6-pyridazone |
| 43 | 2,4,6-tribromopyrimidine |
| 44 | 2,4-dichloro-5-β-sulphatoethylamino-s-triazine |
| 45 | 2,2,3,3-tetrafluorocyclobutylacryloyl chloride |
| 46 | 2-(2',4'-dichloro-s-triazinylamino)-5-(2'-chloro-4'-m-sulphoanilino-s-triazinyoamino)benzene sulphonic acid |
| 47 | 2-(2',4'-dichloro-s-triazinylamino)-5-(2'-chloro-4'-amino-s-triazinylamino)benzene sulphonic acid |
| 48 | 2-(2',4'-dichloro-s-triazinylamino)-5-(2'-chloro-4'-(3'',5''-disulphoanilino)-s-triazinylamino)benzene sulphonic acid |
| 49 | 2-(2',4'-dichloro-s-triazinylamino)-4-(2'-chloro-4'-methoxy-s-triazinylamino)benzene-1,5-disulphonic acid |
| 50 | 2-(2',4'-dichloro-s-triazinylamino)-4-(2'-chloro-4'-m-sulphoanilino-s-triazinylamino)benzene-1,5-disulphonic acid |
| 51 | 2-(2',4'-dichloro-s-triazinylamino)-4-(2'-chloro-4'-amino-s-triazinylamino)benzene-1,5-disulphonic acid |
| 52 | 2-(2',4'-dichloro-s-triazinylamino)-4-[2'-chloro-4'-(3'',5''-disulphoanilino)-s-triazinylamino-]benzene-1,5-disulphonic acid |
| 53 | 2-(2',4'-dichloro-s-triazinylamino)-4-[2'-chloro-4'-(2'',5''-disulphoanilino)-s-triazinylamino]benzene-1,5-disulphonic acid |
| 54 | 2-(2',4'-dichloro-s-triazinylamino)-5-(2'-chloro-4'-methoxy-s-triazinylamino)benzene-1,4-disulphonic acid |
| 55 | 2-(2'4'-dichloro-s-triazinylamino)-5-(2'-chloro-4'-amino-s-triazinylamino)benzene-1,4,-disulphonic acid |
| 56 | 2-(2',4'-dichloro-s-triazinylamino)-5-[2'-chloro-4'-(m-sulphoanilino)-s-triazinylamino]benzene-1,4-disulphonic acid |
| 57 | 2-(2',4'-dichloro-s-triazinylamino)-5-[2'-chloro-4'-(3'',5''-disulphoanilino)-s-triazinylamino)benzene-1,4-disulphonic acid |
| 58 | 2-(2',4'-dichloro-s-triazinylamino)-5-[2'-chloro-4'-(2'',5''-disulphoanilino)-s-triazinylamino]benzene-1,4-disulphonic acid |
| 59 | 2-(2',4'-dichloro-s-triazinylamino)-5-[2'-chloro-4'-(4''-sulphoanilino)-s-triazinylamino]benzene-1,4-disulphonic acid |
| 60 | 2-(2',4'-dichloro-s-triazinylamino)-5-[2'-chloro-4'-(2'''-carboxy-4''-sulphoanilino)-s-triazinylamino]benzene-1,4-disulphonic acid |

-continued

| Example | Acylating Agent |
|---------|-----------------|
| 61 | 2-(2',4'-dichloro-s-triazinylamino)-5-[2'-chloro-4'-(2'',4''-disulphoanilino)-s-triazinylamino]benzene-1,4-disulphonic acid |
| 62 | 2-(2',4'-dichloro-s-triazinylamino)-5-[2'-chloro-4'-(2''-methyl-5''-sulphoanilino)-s-triazinylamino]benzene-1,4-disulphonic acid |
| 63 | 2-(2',4'-dichloro-s-triazinylamino)-5-[2'-chloro-4'-(o-sulphoanilio)-s-triazinylamino]benzene-1,4-disulphonic acid |
| 64 | 2-(2'',4''-dichloro-s-triazinylamino)-5-[2'-chloro-4'-(N''-sulphomethylanilino)-s-triazinyl amino]benzene-1,4-disulphonic acid |
| 65 | 2-(2',4'-dichloro-s-triazinylamino)-5-[2'-chloro-4'-(3'',6'',8''-trisulphonaphthyl-1-amino)-s-triazinylamino]benzene[1,4-disulphonic acid |
| 66 | 2-(2',4'-dichloro-s-triazinylamino)-5-[2'-chloro-4'-(4'',6'',8''-trisulphonaphthyl-2''-amino)-s-triazinylamino]benzene-1,4-disulphonic acid |
| 67 | 2-(2',4'-dichloro-s-triazinylamino)-5-[2'-chloro-4'-(N''-methyl-3''-sulphoanilino)-s-triazinylamino]benzene-1,4-disulphonic acid |
| 68 | 2-(2',4'-dichloro-s-triazinylamino)-5-[2'-chloro-4'-(2''-methyl-4'',5''-disulphoanilino)-s-triazinylamino]benzene-1,4-disulphonic acid |
| 69 | 2-(2',4'-dichloro-s-triazinylamino)-5-[2'-chloro-4'-sulphomethylamino-2-triazinylamino]-benzene-1,4- disulphonic acid |
| 70 | 2-(2',4'-dichloro-s-triazinylamino)-6-[2'-chloro-4'-(3'',6'',8''-trisulphonaphthyl-1''-amino)-s-triazinylamino]naphthalene-4,8-disulphonic acid |
| 71 | 2-(2',4'-dichloro-s-triazinylamino)-6-[2'-chloro-4'-3'',5''-disulphoanilino)-s-triazinyl amino]naphthalene-4,8-disulphonic acid |
| 72 | 2-(2',4'-dichloro-s-triazinylamino)-6-[2'-chloro-4'-(4'',6'',8''-trisulphonaphthyl-2''-amino)-s-triazinylamino]naphthalene-4,8-disulphonic acid |
| 73 | 1-(2',4'-dichloro-s-triazinylamino)-5-[2'-chloro-4'-(3'',6'',8''-trisulphonaphthyl-1'''-amino)-s-triazinylamino]naphthalene-3,7-disulphonic acid |

EXAMPLE 74

A solution of 6.3 parts of N-methyl-4-aminoaniline-2-sulphonic acid in 300 parts of water adjusted to pH 7 is added dropwise at 0°–5° to a suspension of 6.28 parts of cyanuric chloride in 100 parts of water and 1 part of Calsolene Oil. After stirring for 45 minutes at 0°–5°, the pH is adjusted to 4.0 with 2N aqueous sodium hydroxide, and the mixture stirred at pH 4.0 for 1 hour. The mixture is adjusted to pH 5.0, and stirred at pH 5.0 at 0°–5° for 1 hour.

The foregoing mixture is added at a temperature of 50° C and at pH 9.0 to a solution of 8.9 parts of the dyebase prepared as described in Example 4 in 500 parts of water. The mixture is stirred at 40°–45° for 18 hours, maintaining the ph at 9.0. The mixture is cooled to 0°–5°, adjusted to pH 7, and a suspension of 6.28 parts of cyanuric chloride in 50 parts of ice/water and 1 part of Calsolene Oil added. The mixture is stirred at 0°–5° for 5 hours at pH 6.5–7.0. The mixture is salted to 25% w/v with sodium chloride and the precipitated dyestuff filtered off, washed with saturated brine and dried at 60°.

The product obtained dyes cellulose textile materials in bright reddish-blue shades with good fasntess to light.

EXAMPLE 75

The dyestuff of Example 74 is prepared as described above. The solution of the dyestuff prior to salting is added to a solution of 4.4 parts of 3,5-disulphoaniline in 50 parts of water at 40°–45° at pH 6.5–7.0. The resulting mixture is stirred and heated at 40°–45° for 17 hours, maintaining the pH at 6.5–7.0. The mixture is cooled to 20° salted to 35% w/v with sodium chloride, and the precipitated dyestuff filtered off, washed with saturated brine and dried at 60°.

The product obtained dyes cellulose textile materials in bright reddish-blue shades with good fastness to light.

Following the procedure of Example 75, similar dyestuffs are obtained if the 3,5-disulphoaniline is replaced by equivalent amounts of the following.

| Example | Amine |
|---|---|
| 76 | 3-sulphoaniline |
| 77 | 2,5-disulphoaniline |
| 78 | 4-sulphonaline |
| 79 | 1-aminonaphthalene-3,6,8-trisulphonic acid |
| 80 | 2-aminonaphthalene-4,6,8-trisulphonic acid |

Following the procedure of Example 74, similar dyestuffs are obtained if the N-methyl-4-aminoaniline-2sulphonic acid is replaced by equivalent amounts of the following.

| Example | Diamine |
|---|---|
| 81 | N-butyl-4-aminoaniline-2-sulphonic acid |
| 82 | N-ethyl-4-aminoaniline-2-sulphonic acid |
| 83 | N-$\beta$-hydroxyethyl-4-aminoaniline-2-sulphonic acid |

EXAMPLE 84

Using the dyestuff of Example 81 and following the procedure described in Example 75, a product is obtained which dyes cellulose textile materials in bright reddish-blue shades with good fastness to light.

Using the procedure of Example 84, similar dyestuffs are obtained if the 3,5-disulphoaniline is replaced by equivalent amounts of the following amines.

| Example | Amine |
|---|---|
| 85 | 1-aminonaphthalene-3,6,8-trisulphonic acid |
| 86 | 2-aminonaphthalene-4,6,8-trisulphonic acid |
| 87 | ammonia |
| 88 | 2,4-disulphoaniline |

EXAMPLE 89

Using the dyestuff of Example 83 and following the procedure described in Example 75, a product is obtained which dyes cellulose textile materials in bright reddish-blue shades with good fastness to light.

Using the procedure of Example 89, similar dyestuffs are obtained if the 3,5-disulphoaniline is replaced by equivalent amounts of the following amines:

| Example | Amine |
|---|---|
| 90 | ammonia |
| 91 | methylamine |
| 92 | 1-aminonaphthalene-3,6,8-trisulphonic acid |
| 93 | 2-aminonaphthalene-4,6,8-trisulphonic acid |
| 94 | 3-sulphoaniline |
| 95 | 4-sulphoaniline |
| 96 | N-methyl-3-sulphoaniline |
| 97 | N-$\beta$-hydroxyethyl-3-sulphoaniline |

EXAMPLE 98

Using the procedure of Example 4, 4.9 parts of 2,4-diaminobenzene sulphonic acid in place of the metanilic acid are reacted with cyanuric chloride and the resulting 2-amino-4-(2',4'-dichloro-s-triazinylamino)-benzene sulphonic acid reacted with 22.5 parts of the triphendioxazine dyebase described in Example 4, giving a soluion of the dyestuff described in Example 11.

The foregoing solution is cooled to 0°–5° and a suspension of 10 parts of cyanuric chloride in 100 parts of ice and water containing a little Calsolene Oil is added. The mixture is stirred at 5°–5° for 6 hours maintaining the pH in the range 6.0–7.0. Excess cyanuric chloride is removed by filtration, giving approximately 1200 parts of a solution of a dyestuff.

This product dyes cellulose textile materials in bright reddish-blue shades of good fastness to light.

EXAMPLE 99

A solution of 4 parts of metanilic acid in 500 parts of water and approximately 8 parts of 2N aqueous sodium hydroxide is added to approximately 600 parts of a solution of the dyestuff described in Example 98. The resulting mixture is stirred and heated at 35°–40° for 12 hours, maintaining the pH in the range 6.0–6.5. The solution is salted to 25% w/v with sodium chloride, and the precipitated dyestuff filtered off, washed with saturated brine and dried at 60°.

The dyestuff produces bright reddish-blue shades of good fastness to light when applied to cellulose textile materials.

Dyestuffs giving a similar shade are obtained if the following amines replace the metanilic acid in Example 99.

| Example | Amine |
|---|---|
| 100 | 1-aminonaphthalene-3,6,8-trisulphonic acid |
| 101 | aniline-3,5-disulphonic acid |
| 102 | aniline-2,5-disulphonic acid |
| 103 | 2-carboxyaniline-4-sulphonic acid |
| 104 | aniline-2,4-disulphonic acid |
| 105 | sulphanilic acid |
| 106 | orthanilic acid |
| 107 | 1-aminonaphthalene-4,6-dulsphonic acid |

EXAMPLE 108

18.4 parts of 2,4-bis-(2',4'-dichloro-s-triazinylamino)-benzene-1,5-disulphonic acid are added to a solution of 3.5 parts of a triphendioxazine dyebase prepared as described in Example 4 in 600 parts of water, and the resulting mixture stirred at 40° for 1¼ hours, maintaining the pH in the region 8.8–9.0. The pH is adjusted to 7.0 and the mixture salted to 30% with potassium chloride. The precipitated dyestuff is collected, washed with approximately 200 parts of saturated potassium chloride and slurried into 600 parts of acetone at 0°–5°. Approximately 85 parts of water are added dropwise until the dyestuff begins to dissolve. The purified dyestuff is filtered off, washed with 100 parts of acetone and vacuum-dried at 20°–25° to 20 hours.

This product dyes cellulose textile material bright reddish-blue shades of good fastness to light.

EXAMPLE 109

3.5 parts of a triphendioxazine dyebase prepared as described in Example 4 is reacted with 18.4 parts of 2,4-bis(2′,4′-dichloro-s-triazinylamino)-benzene-1,5-disulphonic acid, giving the dyestuff described in Example 105.

This product is dissolved in 100 parts of water and 1.76 parts of concentrated aqueous ammonia are added. The resulting mixture is stirred at 25°–30° for 12 hours, salted with 20 parts of sodium chloride, and the precipitated dyestuff filtered off, washed with a little 25% brine and vacuum dried at 45°.

The product dyes cellulose textile materials in bright reddish-blue shades of good fastness to light.

EXAMPLE 110

3.5 parts of a triphendioxazine dyebase prepared as described in Example 4 is reacted with 18.4 parts of 2,4-bis-(2′,4′-dichloro-s-triazinylamino)-benzene-1,5-disulphonic acid, giving the dyestuff described in Example 108.

This product is dissolved in 100 parts of water, and a neutral aqueous solution of 4.65 parts of 4-sulphophenol is added. The resulting mixture is stirred and heated at 40°–45° at pH 7.8–8.0 for 12 hours. The pH is adjusted to 7.0 and the mixture salted with 15 parts of sodium chloride and 15 parts of potassium chloride. The precipitated dyestuff is filtered off, washed with a mixture of saturated aqueous sodium chloride and potassium chloride solutions and vacuum dried at 45°.

The product dyes cellulose textile materials in bright reddish-blue shades of good fastness to light.

EXAMPLE 111

3.5 parts of a triphendioxazine dyebase prepared as described in Example 4 is reacted with 18.4 parts of 2,4-bis-(2′,4′-dichloro-s-triazinylamino)-benzene-1,5-disulphonic acid, giving the dyestuff described in Example 108.

This product is dissolved in 100 parts of water and a neutral aqueous solution of 3.4 parts of metanilic acid is added, and the resulting mixture stirred and heated at 40°–45° for 12 hours at pH 6.5–7.0. The mixture is salted with 20 parts of sodium chloride, and the precipitated dye filtered off, washed with 25% brine and vacuum dried at 45°.

The product dyes cellulose textile materials in bright reddish-blue shades of good fastness to light.

Similar dyestuffs are obtained when the following amines replace the metanilic acid in Example 111.

| Example | Amine |
|---|---|
| 112 | aniline-3,5-disulphonic acid |
| 113 | aniline-2,5-disulphonic acid |
| 114 | orthanilic acid |
| 115 | sulphanilic acid |
| 116 | 1-aminonaphthalene-3,6,8-trisulphonic acid |

EXAMPLE 117

Following the procedure of Example 108, using 2,5-bis-(2′,4′-dichloro-s-triazinylamino)benzene-1,4-disulphonic acid in place of 2,4-bis-(2′,4′-dichloro-s-triazinylamino)benzene-1,5-disulphonic acid, a dyestuff of similar properties is obtained.

EXAMPLE 118

3.5 parts of a triphendioxazine dyebase prepared as described in Example 4 is reacted with 18.4 parts of 2,5-bis-(2′,4′-dichloro-s-triazinylanino)benzene-1,4-disulphonic acid, giving the dyestuff described in Example 105.

This product is dissolved in 100 parts of water and 1.76 parts of concentrated aqueous ammonia are added. The resulting mixture is stirred at 25°–30° for 12 hours, salted with 20 parts of sodium chloride, and the precipitated dyestuff filtered off, washed with a little 25% brine and vacuum dried at 45°.

The product dyes cellulose textile materials in bright reddish-blue shades of good fastness to light.

EXAMPLE 119

3.5 parts of a triphendioxazine dyebase prepared as described in Example 4 is reacted with 18.4 parts of 2,5-bis-(2′,4′-dichloro-s-triazinylamino)benzene-1,4-disulphonic acid, giving the dyestuff described in Example 108.

This product is dissolved in 100 parts of water, and a neutral aqueous solution of 4.65 parts of 4-sulphophenol is added. The resulting mixture is stirred and heated at 40°–45° at pH 7.8–8.0 for 12 hours. The pH is adjusted to 7.0 and the mixture salted with 15 parts of sodium chloride and 15 parts of potassium chloride. The precipitated dyestuff is filtered off, washed with a mixture of saturated aqueous sodium chloride and potassium chloride solutions and vacuum dried at 45°.

The product dyes cellulose textile materials in bright reddish-blue shades of good fastness to light.

EXAMPLE 120

3.5 parts of a triphendioxazine dyebase prepared as described in Example 4 is reacted with 18.4 parts of 2,5-bis-(2′,4′-dichloro-s-triazinylamino)benzene-1,4-disulphonic acid, giving the dyestuff described in Example 108.

This product is dissolved in 100 parts of water and a neutral aqueous solution of 3.4 parts of metallic acid is added, and the resulting mixture stirred and heated at 40°–45° for 12 hours at pH 6.5–7.0. The mixture is salted with 20 parts of sodium chloride, and the precipitated dye filtered off, washed with 25% brine and vacuum dried at 45°.

The product dyes cellulose textile materials in bright reddish-blue shades of good fastness to light.

Similar dyestuffs are obtained when the following amines replace the metanillic acid in Example 120.

| Example | Amine |
|---|---|
| 121 | aniline-3,5-disulphonic acid |
| 122 | aniline-2,5-disulphonic acid |
| 123 | orthanilic acid |
| 124 | sulphanilic acid |
| 125 | 1-aminonaphthalene-3,6,8-trisulphonic acid |

EXAMPLE 126

51 parts of 4-(3′-amino-2′-hydroxypropyl)aminoaniline-3-sulphonic acid are dissolved in 800 parts of water at 50° and the pH adjusted to 7.0. A suspension of 20.3 parts of 2,3,5,6-tetrachlorobenzene-1,4-quinone in 50 parts of water containing a little Calsolene oil is added and the mixture stirred and heated at 50° for 5 hours maintaining the pH at 7.0. The mixture is cooled to 10° and the product filtered off, washed with 800 parts of cold water and with 100 parts of acetone and dried at 60°.

55 parts of the foregoing product are added to 690 parts of sulphuric acid monohydrate keeping the temperature below 40°, and stirred for 1 hour. 310 parts of 65% oleum are then added, again keeping the temperature below 40°. The mixture is then heated at 50°–55° for 1 hour, cooled to 0°–5°, poured into 4000 parts of ice and water, and the crude product filtered off. The crude product is slurried into 1500 parts of water and the pH adjusted to 7.0 with the addition of 35% aqueous sodium hydroxide, and the purified product filtered off, washed with 800 parts of cold water and vacuum dried at 40°.

The product is believed to be represented by formula (1) wherein $n = 0$, $b = 1$, $X = NH$, $Y = CH_2CH(OSO_3H)CH_2$ and $R^1$ and $Z = H$.

The 4-(3'-amino-2'-hydroxypropylamino)aniline-3-sulphonic acid used is obtained by condensing 4-nitrochlorobenzene-2 2-sulphonic acid with 1,3-diamino-2-hydroxypropane, and reducing the resulting nitroamino compound.

A solution of 4 parts of the product in 200 parts of water containing 5 parts of 2N aqueous sodium hydroxide is added dropwise at 0–5° to a suspension of 1.3 parts of cyanuric chloride in 50 parts of ice and water containing a little Calsolene Oil, keeping the pH in the range of 89.5–9.0. The resulting mixture is stirred at 0–5° at pH 8.5–9.0 for 2 hours. The pH is adjusted to 7.0 with the addition of a little 2N hydrochloric acid, and the mixture filtered and the filtrate salted to 20% with sodium chloride. The precipitated dyestuff is collected, washed with 25% brine containing approximately 1% w/v of a mixture of 1 part of disodium hydrogen phosphate and 2 parts of potassium dihydrogen phosphate and vacuum dried at room temperature.

The product dyes cellulose textile materials a bright reddish-blue shade of good fastness to light.

Similar dyestuffs are obtained when cyanuric chloride in Example 126 is replaced by equivalent amounts of the following heterocyclic halides.

| Example | Heterocyclic Halide |
|---|---|
| 127 | 2,4-dichloro-6-methoxy-s-triazine |
| 128 | 2,4-dichloro-6-amino-s-triazine |
| 129 | 2,4-dichloro-6-methylamino-s-triazine |
| 130 | 2,4-dichloro-6-n-butylamino-s-triazine |
| 131 | 2,4-dichloro-6-p-toluidino-s-triazine |
| 132 | 2,4-dichloro-6-p-chloroanilino-s-triazine |
| 133 | 2,4-dichloro-6-p-nitroanilino-s-triazine |
| 134 | 2,4-dichloro-6-dimethylamino-s-triazine |
| 135 | 2,4-dichloro-6-p-sulphophenoxy-s-triazine |
| 136 | 2,3-dichloroquinoxaline-6-sulphonylchloride |
| 137 | 2,4,5,6-tetrachloropyrimidine |
| 138 | 2,4,6-trifluoro-5-chloropyrimidine |
| 139 | 1,4-dichlorophthalazine-6-carbonyl chloride |
| 140 | 2,4-dichloro-6-n-butoxy-s-triazine |
| 141 | 2,4,6-trichloropyrimidine |
| 142 | 2,4,6-trichloro-5-cyanopyrimidine |
| 143 | 1-(4'-chlorocarbonylphenyl)-4,5-dichloro-6-pyridazone |
| 144 | 2,4,6-tribromopyrimidine |
| 145 | 2,4-dichloro-6-β-sulphatoethylamino-s-triazine |
| 146 | 2,2,3,3-tetrafluorocyclobutylacryloyl chloride |
| 147 | 2-(2',4'-dichloro-s-triazinylamino)-5-(2'-chloro-4'-m-sulphoanilino)benzene sulphonic acid |
| 148 | 2-(2',4'-dichloro-s-triazinylamino)-5-(2'-chloro-4'-amino-s-triazinylamino)benzene sulphonic acid |
| 149 | 2-(2',4'-dichloro-s-triazinylamino)-5-(2'-chloro-4'-(3'',5''-disulphoanilino)-s-triazinylamino)benzene sulphonic acid |
| 150 | 2-(2',4'-dichloro-s-triazinylamino)-4-(2'-chloro-4'-methoxy-s-triazinylamino)benzene-1,5-disulphonic acid |
| 151 | 2-(2',4'-dichloro-s-triazinylamino)-4-(2'-chloro-4'-m-sulphoanilino-s-triazinylamino)benzene-1,5-disulphonic acid |
| 152 | 2-(2',4'-dichloro-s-triazinylamino)-4-(2'-chloro-4'-amino-s-triazinylamino)benzene-1,5-disulphonic acid |
| 153 | 2-(2',4'-dichloro-s-triazinylamino)-4-[2'-chloro-4'-(3'',5''-disulphoanilino)-s-triazinylamino]benzene-1,5-disulphonic acid |
| 154 | 2-(2',4'-dichloro-s-triazinylamino)-4-[ 2'-chloro-4'-(2'',5''-disulphoanilino)-s-triazinylamino]benzene-1,5-disulphonic acid |
| 155 | 2-(2',4'-dichloro-s-triazinylamino)-5-(2'-chloro-4'-methoxy-s-triazinylamino)benzene-1,4-disulphonic acid |
| 156 | 2-(2',4'-dichloro-s-triazinylamino)-5-(2'-chloro-4'-amino-s-triazinylamino)benzene-1,4-disulphonic acid |
| 157 | 2-(2',4'-dichloro-s-triazinylamino)-5-[2'-chloro-4'-(m-sulphoanilino)-s-triazinylamino]benzene-1,4-disulphonic acid |
| 158 | 2-(2',4'-dichloro-s-triazinylamino)-5-[2'-chloro-4'-(3'',5''-disulphoanilino)-s-triazinylamino)benzene-1,4-disulphonic acid |
| 159 | 2-(2',4'-dichloro-s-triazinylamino)-5-[2'-chloro-4'-(2'',5''-disulphoanilino)-s-triazinylamino]benzene-1,4-disulphonic acid |
| 160 | 2-(2',4'-dichloro-s-triazinylamino)-5-[2'-chloro-4'-(4''-sulphoanilino-s-triazinylamino]benzene-1,4-disulphonic acid |
| 161 | 2-(2',4'-dichloro-s-triazinylamino)-5-[2'-chloro-4'-(2''-carboxy-4''-sulphoanilino)-s-triazinylamino]benzene-1,4-disulphonic acid |
| 162 | 2-(2',4'-dichloro-s-triazinylamino)-5-[2'-chloro-4'-(2'',4''-disulphoanilino)-s-triazinylamino]benzene-1,4-disulphonic acid |
| 163 | 2-(2',4'-dichloro-s-triazinylamino)-5-[2'-chloro-4'-(2''-methyl-5''-sulphoanilino)-s-triazinylamino]benzene-1,4-disulphonic acid |
| 164 | 2-(2',4'-dichloro-s-triazinylamino)-5-[2'-chloro-4'-(o-sulphoanilino)-s-triazinylamino]benzene-1,4-disulphonic acid |
| 165 | 2-(2',4'-dichloro-s-triazinylamino)-5-[2'-chloro-4'-(N''-sulphomethylanilino)-s-triazinylamino]benzene-1,4-disulphonic acid |
| 166 | 2-(2',4'-dichloro-s-triazinylamino)-5-[2'-chloro-4'-(3'',6'',8''-trisulphonaphthyl-1-amino)-s-triazinylamino]benzene-1,4-disulphonic acid |
| 167 | 2-(2',4'-dichloro-s-triazinylamino)-5-[ 2'-chloro-4'-(4'',6'',8''-trisulphonaphthyl-2''-amino)-s-triazinylamino]benzene-1,4-disulphonic acid |
| 168 | 2-(2',4'-dichloro-s-triazinylamino)-5-[2'-chloro-4'-(N''-methyl-3''-sulphoanilino)-s-triazinylamino]benzene-1,4-disulphonic acid |
| 169 | 2-(2',4'-dichloro-s-triazinylamino)-5-[2'-chloro-4'-(2''-methyl-4'',5''-disulphoanilino)-s-triazinylamino]benzene-1,4-disulphonic acid |
| 170 | 2-(2',4'-dichloro-s-triazinylamino)-5-[2'-chloro-4'-sulphomethylamino-s-triazinylamino]-benzene-1,4-disulphonic acid |
| 171 | 2-(2',4'-dichloro-s-triazinylamino)-6-[2'-chloro-4'-(3'',6'',8''-trisulphonaphthyl-1''-amino)-s-triazinylamino]naphthalene-4,8-disulphonic acid |
| 172 | 2-(2',4'-dichloro-s-triazinylamino)-6-[2'-chloro-4'-(3'',5''-disulphoanilino)-s-triazinylamino]naphthalene-4,8-disulphonic acid |
| 173 | 2-(2',4'-dichloro-2-triazinylamino)-6-[2'-chloro-4'-(4'',6'',8''-trisulphonaphthyl-2''-amino)-s-triazinylamino]naphthalene-4,8-disulphonic acid |
| 174 | 1-(2',4'-dichloro-s-triazinylamino)-5-[2'-chloro-4'-(3'',6'',8''-trisulphonaphthyl-1'''-amino)-s-triazinylamino]naphthalene-3,7-disulphonic acid. |

EXAMPLE 175

8 parts of the triphendioxazine dyebase described in Example 126 are reacted with 2.2 parts of cyanuric chloride under similar conditions to those described in Example 126. The mixture, after stirring for 3 hours at 0–6° at pH 8.5–8.8, is screened, and the filtrate added to a solution of 2.5 parts of metanilic acid in 40 parts of water containing 5 parts of 2N aqueous sodium hydroxide. The resulting mixture is stirred and heated at 40° for 10 hours at pH 7.0, cooled to 20–25° and salted to 30% with sodium chloride. The precipitated dyestuff is filtered off, washed with saturated brine and dried at 60°.

The product dyes cellulose textile materials in bright reddish-blue shades of good fastness to light.

Similar dyes are obtained when the following amine replaces the metanilic acid in Example 175.

| Example | Amine |
|---------|-------|
| 176 | sulphanilic acid |
| 177 | orthanilic acid |
| 178 | aniline-2,5-disulphonic acid |
| 179 | 1-aminonaphthalene-6-sulphonic acid |
| 180 | 1-aminonaphthalene-7-sulphonic acid |
| 181 | 1-aminonaphthalene-4-sulphonic acid |
| 182 | 2-aminonaphthalene-1-sulphonic acid |

EXAMPLE 183

A suspension of 5 parts of 2,3,5,6-tetrachlorobenzo-1,4-quinone in 20 parts of water containing a little Calsolene Oil is added to a solution of 18 parts of 4-(4'-sulphoamino)benzylamino aniline-3-sulphonic acid in 300 parts of water containing 15 parts of 2N aqueous sodium hydroxide, and the mixture stirred and heated at 50°–55° for 3 hours, maintaining the pH at 7.8–8.0. The mixture is cooled to 25° and salted to 10% with sodium chloride. 59 parts of concentrated hydrochloric acid are then added, reducing the pH to 1.0 and the resultant mixture stirred 2 hours at 25°. The product is filtered off, washed successively with 2N hydrochloric acid and acetone and dried at 60°.

18 parts of the foregoing product are added to 400 parts of 25% oleum, and the resulting mixture stirred and heated at 80° for 15 minutes, cooled whilst stirring at 25° over 1¼ hours, poured into 1000 parts of ice and water keeping the temperature below 20° and the crude product filtered off and washed with 200 parts of cold water.

The crude product is redissolved in 500 parts of water and 50 parts of 2N aqueous sodium hydroxide at pH 11, filtered and the dye precipitated from the filtrate with the addition of approximately 50 parts of saturated aqueous potassium acetate. The purified dye is collected, washed with 10% aqueous potassium acetate and finally with ethanol and dried at 60°.

The product is believed to be represented by formula (1) wherein $n = 0$, $a = b = 1$, $X = NH$,

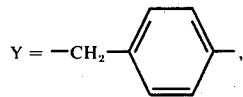

$R^1$ and $Z = H$.

The 4-(4'-sulphoamino)benzylaminoaniline-3-sulphonic acid used is obtained by treatment of p-nitrobenzylamine hydrobromide with sodium bisulphite at 95°–100° and condensing the resulting 4-sulphoaminobenzylamine with 4-nitrochlorobenzene-2-sulphonic acid, giving 4-(4'-sulphoaminobenzylamino)-nitrobenzene-3-sylphonic acid, which is reduced.

0.3 parts of the above product are reacted with 0.2 parts of cyanuric chloride using similar conditions to those described in Example 126.

The product dyes cellulose textile materials blue shades with good fastness to light.

EXAMPLE 184

A suspension of 7.5 parts of 2,3,5,6-tetrachlorobenzo-1,4-quinone in 50 parts of water containing a little Calsolene Oil is added at 50° to a solution of 19.6 parts of N-4'-amino-2'-sulphophenylpiperazine in 1000 parts of water. The resulting mixture is stirred at 50° for 20 hours at pH 6.0. The product is collected washed with cold water and acetone and dried at 60° C.

18 parts of the foregoing product are added to 400 parts of 25% oleum and the resulting mixture heated at 100° for 20 minutes, cooled to 25° and poured into 1000 parts of ice and water. 3000 parts of ethanol are then added and the precipitated product filtered off. The crude product thus obtained is redissolved in 2500 parts of water, salted to 60% with potassium acetate and the precipitated purified dye filtered off, washed with 200 parts of ethanol and dried at 60°.

The product is believed to be represented by formula (1) wherein $n = 0$, $a = b = 1$,

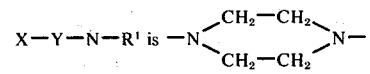

and $Z = H$.

The N-4'-amino-2'-sulphophenylpiperazine used is obtained by condensing piperazine and 4-nitrochlorobenzene-2-sulphonic acid and reducing the resulting N-4'-nitro-2'-sulphophenylpiperazine.

5.5 parts of the above product are reacted with 4 parts of cyanuric chloride using similar conditions to those described in Example 126.

The product dyes cellulose textile materials blue shades of good fastness to light.

EXAMPLE 185

3.5 parts of the triphendioxazine dyebase prepared as described in Example 4 are added to a solution of 0.9 parts of 33.5% aqueous formaldehyde, 2 parts of 40% aqueous sodium bisulphite and 4.5 parts of 2N aqueous sodium hydroxide in 10 parts of water, and the resulting mixture stirred and heated at 70°–75° for 1 hour at pH 10.5. The mixture is cooled to 0°–5° and the dye precipitated with the addition of 25 parts of saturated aqueous potassium acetate. The dye is collected, washed with 25% aqueous potassium acetate and with ethanol and dried at 50°.

The product is believed to be represented by formula (1) wherein $n = 0$, $a = b = 1$, $X = NH$, $Y = CH_2CH_2$, $R^1 = CH_2SO_3H$ and $Z = H$.

1 Part of the foregoing product is reacted with 0.5 parts of cyanuric chloride in an aqueous acetone medium using similar conditions to those described in Example 1.

The product dyes cellulose textile materials in bright reddish-blue shades of good fastness to light.

EXAMPLE 186

7.6 Parts of the dyestuff of Example 4 are added to a solution of 1.23 parts of nicotinic acid in 150 parts of water, and the resulting mixture stirred and heated at 100° for 16 hours. The mixture is cooled to 25°, diluted with 600 parts of acetone and the precipitated dyestuff separated and dried at 50°. The product dyes cellulose textile materials bright reddish-blue shades with good fastness to light.

Following the procedure of Example 186 with dyestuffs made according to Example 4 using the following amines in place of metanilic acid, similar dyestuffs to that described in Example 186 are obtained.

| Example | Amine |
|---|---|
| 187 | 4-sulphoaniline |
| 188 | 3,5-disulphoaniline |
| 189 | 3,5-dicarboxyaniline |
| 190 | 4-carboxyaniline |
| 191 | 1-amino-3,6,8-trisulphonaphthalene |
| 192 | 2-amino-4,6,8-trisulphonaphthalene |

EXAMPLE 193

2.6 Parts of pyridine are added to a neutral solution of 7.35 parts of the dyestuff of Example 7 in 100 parts of water. The mixture is heated to 80° over 1 hour, and stirred at 75°–80° for a further 1 hour. The mixture is treated with 10 parts of sodium chloride, cooled to 0°–5° and the precipitated dyestuff filtered off, washed with 15% brine, suspended in 200 parts of acetone, refiltered, washed with 100 parts of acetone and dried at 50°.

The product obtained dyes cellulose textile materials bright reddish-blue shades of good fastness to light.

Following the procedures of Example 193 with dyestuffs made according to Example 7 using the following amines in place of 3,5-disulphoanilino, similar dyestuffs to that described in Example 193 are obtained.

| Example | Amine |
|---|---|
| 194 | 1-amino-3,6,8-trisulphonaphthalene |
| 195 | 2-amino-4,6,8-trisulphonaphthalene |
| 196 | 2,5-disulphoaniline |
| 197 | 2,4-disulphoaniline |

EXAMPLE 198

A solution of 3.33 parts of 1,6-diaminonaphthalene-3,8-disulphonic acid in 100 parts of water at pH 7.0 is added dropwise over 1 hour at 0°–5° to a suspension of 1.72 parts of cyanuric chloride in 50 parts of ice/water and 1 part of Calsolene Oil. After stirring for 1 hour at 0°–5° the pH is adjusted from 2.3 to 4.0, and the mixture stirred at pH 4.0 for 1 hour. The pH is then adjusted to 5.0 and the mixture stirred at 0°–5° for a further 1 hour.

The foregoing solution is added at 50° at pH 9.0 to a solution of 2.45 parts of the dyebase prepared as in Example 4 and the resulting mixture stirred at 40°–45° for 18 hours, maintaining the pH at 9.0 with 2N aqueous sodium hydroxide. The mixture is cooled to 0°–5° and the pH adjusted to 7.0. A suspension of 1.72 parts of cyanuric chloride in 25 parts of water containing 0.5 parts of Calsolene Oil is then added, and the resulting mixture stirred at 0°–5° for 6 hours at pH 6.5–7.0.

The above mixture is heated to 40°–45°, and a solution of 7.7 parts of 1-aminonaphthalene-3,6,8-trisulphonic acid in 25 parts of water is added. The mixture is heated at 40°–45° for 18 hours at pH 6.5–7.0, then at 60° at pH 6.5–7.0 for 10 hours.

The mixture is filtered and the filtrate cooled to 25° and salted to 25% w/v with sodium chloride. The precipitated dyestuff is filtered off, slurried with 300 parts of ethanol and 200 parts of water, refiltered, washed with a little enhanol and dried at 60°.

The product is believed to have the structure given by formula (6) wherein $G = -C_2H_4-$, $R^1 = R^2 = H$ and $Z =$

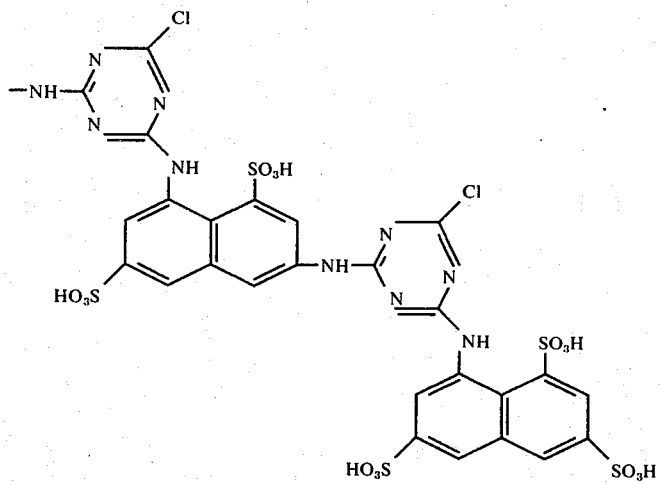

The product obtained dyes cellulose textile materials bright reddish-blue shades of good fastness to light.

Following the procedure of Example 195, similar dyestuffs are obtained using the following amines in place of 1-aminonaphthalene-3,6,8-trisulphonic acid.

| Example | Amine |
|---|---|
| 199 | 2-amino-4,6,8-trisulphonaphthalene |
| 200 | 3,5-disulphoaniline |
| 201 | 2-carboxy-4,5-disulphoaniline |

We claim:
1. A dyestuff of the formula

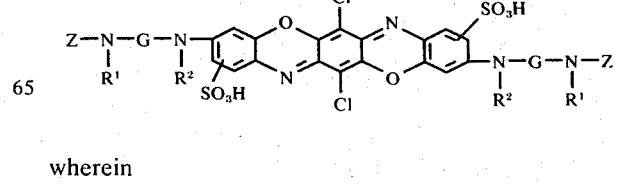

wherein $R^1$ and $R^2$ are selected from the group consisting of H, $CH_2SO_3H$ and $R^1$ and $R^2$ together being $-CH_2CH_2-$, G is selected from the group consisting of $-CH_2CH_2-$, $-CH_2CH(OH)CH_2-$, $-CH_2-CH(OSO_3H)CH_2-$ and

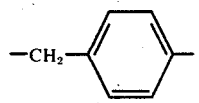

and each Z is independently selected from the group consisting of hydrogen, 2,3-dichloroquinoxaline-6-sulphonyl, trichloropyrimidinyl, dichloropyrimidinyl, 1,4-dichlorophthazine-6-carbonyl, dichloro-5-cyanopyrimidinyl, difluoro-5-chloropyrimidinyl, 1-(carboxylphenyl)-4,5-dichloro-6-pyridazonyl, dibromopyrimidinyl, tetrafluoro-cyclo-butylacryloyl,

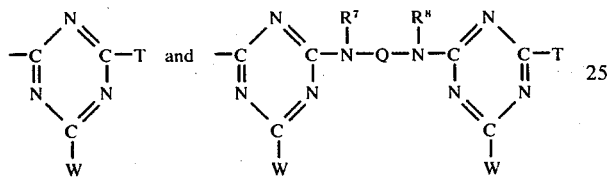

wherein W is selected from the group consisting of Cl and

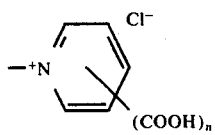

wherein $n = 0$ or 1, T is selected from the group consisting of Cl, $NH_2$, $C_1^-{}_4$ alkylamino, di($C_1^-{}_4$alkyl)amino, $C_1^-{}_4$alkoxy, $C_2^-{}_3$hydroxyalkylamino, di($C_2^-{}_3$hydroxyalkyl)amino, sulphophenoxy N-($\beta$-hydroxyethyl) sulphoanilino, N-(sulphomethyl)anilino, N-methylsulphoanilino, dicarboxyanilino, $\beta$-sulphatoethylamino, sulphomethylamino, sulphonaphthylamino, disulphonaphthylamino, trisulphonaphthylamino, and

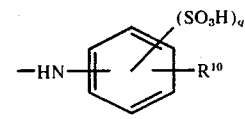

wherein $R^{10}$ is selected from the group consisting of hydrogen, $CH_3$, $NO_2$, $NH_2$, Cl and COOH and $q$ is 0, 1 or 2, and wherein

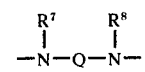

is the N,N'-diradical of a diamine selected from the group consisting of 2,5-diaminobenzene sulphonic acid, 2,4-diaminobenzene sulphonic acid, 2,4-diaminobenzene-1,5-disulphonic acid, 2,5-diaminobenzene-1,4-disulphonic acid, 2,6-diaminonaphthaline-4,8-disulphonic acid, 1,5-diaminonaphthalene-3,7-disulphonic acid, 1,6-diaminonaphthalene-3,8-disulphonic acid, N-methyl-4-aminoaniline-2-sulphonic acid, N-butyl-4-aminoaniline-2-sulphonic acid, N-ethyl4-aminoaniline-2-sulphonic acid and N-($\beta$-hydroxyethyl)-4-aminoaniline-2-sulphonic acid.

2. A dyestuff as claimed in claim 1 having the formula:

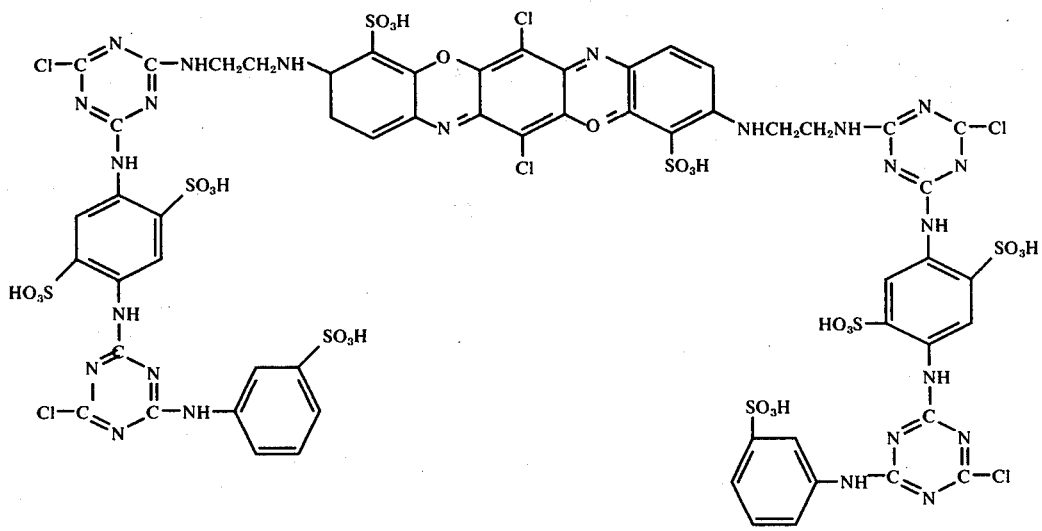

3. A dyestuff as claimed in claim 1 having the formula:

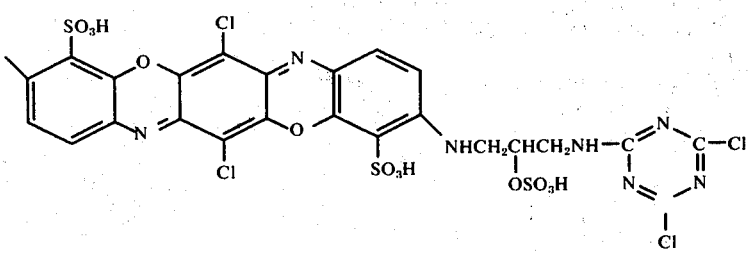
* * * * *